US006658828B2

(12) United States Patent
Franet

(10) Patent No.: US 6,658,828 B2
(45) Date of Patent: Dec. 9, 2003

(54) MOWING IMPLEMENT INCLUDING MOWING UNITS CONNECTED TO CARRIER FRAME EXCLUSIVE OF WINDROWING DEVICE

(75) Inventor: Roger Franet, Sarreguemines (FR)

(73) Assignee: Deere & Company, Moline, IL (US)

( * ) Notice: Subject to any disclaimer, the term of this patent is extended or adjusted under 35 U.S.C. 154(b) by 25 days.

(21) Appl. No.: 09/730,163

(22) Filed: Dec. 5, 2000

(65) Prior Publication Data

US 2001/0003239 A1 Jun. 14, 2001

(30) Foreign Application Priority Data

Dec. 10, 1999 (DE) .......................................... 199 59 484

(51) Int. Cl.[7] .............................................. A01D 75/30
(52) U.S. Cl. ............................................................ 56/7
(58) Field of Search ......................... 56/6, 7, 192, 193, 56/13.6, 228, DIG. 21, 377

(56) References Cited

U.S. PATENT DOCUMENTS

| | | | |
|---|---|---|---|
| 2,811,003 A | | 10/1957 | Getz |
| 2,994,180 A | * | 8/1961 | Van Der Lely et al. ...... 56/377 |
| 3,650,096 A | * | 3/1972 | Caldwell .......................... 56/7 |
| 3,717,981 A | * | 2/1973 | Van Der Lely .................. 56/6 |
| 4,078,366 A | * | 3/1978 | Carmichael .................. 56/377 |
| 4,135,349 A | * | 1/1979 | Schwertner ...................... 56/6 |
| 4,185,445 A | | 1/1980 | van der Lely |
| 4,392,339 A | | 7/1983 | Berlivet et al. |
| 4,573,306 A | * | 3/1986 | Smith et al. .................. 56/10.4 |
| 4,858,418 A | * | 8/1989 | von Allwoerden ........... 56/15.5 |
| 4,926,621 A | * | 5/1990 | Torras ............................. 56/6 |
| 4,932,197 A | * | 6/1990 | Allen ........................... 56/377 |
| 4,974,399 A | * | 12/1990 | Haberkorn ........................ 56/6 |
| 5,031,393 A | * | 7/1991 | Rostoucher .................. 56/154 |
| 5,351,468 A | | 10/1994 | Pominville |
| 6,145,289 A | * | 11/2000 | Welsch et al. ................ 56/192 |

FOREIGN PATENT DOCUMENTS

| | | | |
|---|---|---|---|
| CH | 06 07 841 | 11/1978 | |
| DE | 27 15 375 B2 | 10/1980 | |
| DE | 4422502 | * 6/1995 | .......... A01D/43/10 |
| EP | 04 39 991 A1 | 8/1991 | |
| EP | 0 439 991 | 8/1991 | |
| EP | 04 61 280 A1 | 12/1991 | |
| EP | 06 51 938 A1 | 5/1995 | |
| EP | 0 882 386 A2 | 12/1998 | |
| EP | 0 934 690 | 8/1999 | |
| FR | 755621 | * 1/1997 | .......... A01B/73/00 |
| FR | 2 792 163 | 10/2000 | |

* cited by examiner

Primary Examiner—Árpád F Kovács

(57) ABSTRACT

A mowing arrangement includes a tractor carrying a front-mounted mower unit and towing a mobile carrier frame having left and right mower units mounted to opposite sides of the carrier frame. In a first embodiment, the carrier frame is box-shaped in plan view. A pair of mower unit support arms are respectively mounted to forward outer locations of the carrier frame for pivoting vertically between horizontal first positions, wherein they dispose the mower units in respective operating positions, and vertical second positions, wherein they dispose the mower units in raised transport positions. Right and left swath formers, in the form of flat belt conveyors, are respectively mounted to outer rear locations at the opposite sides of the carrier frame by support structures permitting the swath formers to be moved horizontally between operating positions wherein they intercept crop discharged by the mower units and convey the crop inwardly to deposit it in respective swaths on opposite sides of the swath deposited by the front-mounted mower unit. In a second embodiment, the right and left mower units are mounted to the opposite ends of a beam forming the main structural member of the mobile carrier frame, these mowing units being mounted for movement between operating positions and transport positions alongside a draft tongue projecting forwardly from a center front location of the beam. In this embodiment, the swath formers are mounted for vertical movement between operative and non-operative positions.

7 Claims, 2 Drawing Sheets

MOWING IMPLEMENT INCLUDING MOWING UNITS CONNECTED TO CARRIER FRAME EXCLUSIVE OF WINDROWING DEVICE

The present invention relates to a mowing implement with at least two mowing units, at least one swath former and a mobile carrier frame.

BACKGROUND OF THE INVENTION

EP-A1-0 882 386 discloses a mowing implement with two mowing units, each of which is attached by a cantilever arm to a chassis so as to pivot vertically. Each mowing unit is provided on its downstream side with a conditioning unit that conveys the conditioned crop into a hood extending at an angle to the direction of operation. The inclination of the hood is selected in such a way that a swath of crop can be formed in the center between two mowing units. Furthermore, at the outlet of the hood, a sheet metal component is provided that can be pivoted vertically and extended into the stream of the crop so as to deflect the latter. The vertically pivoted suspension of the mowing and conditioning units on the chassis makes it possible to attain a great width of the mowing cut on the field and to develop a width for transport on public roads within allowable width limits.

The problem underlying the invention is seen in the fact that with wide mowers a larger sideways offset deposit of the crop is not possible.

SUMMARY OF THE INVENTION

According to the present invention there is provided an improved mowing implement including at least a mobile carrying frame to which is mounted two mowing units with swath forming devices.

An object of the invention is to provide a mowing implement, of the type mentioned above, which is capable of mowing a wide swath of crop and to either converge or leave the cut crop deposited in a wide swath, and to be able to narrow the mowing implement for transport on highways having a legal width limit.

A more specific object of the invention is to provide a mowing implement including two mowing units mounted to opposite sides of a mobile carrier and having associated therewith swath formers that are mounted to the mobile carrier separately from the mowing units for movement between first positions, wherein the swath formers intercept and convey inwardly the crop discharged from the mowing units, and second positions wherein they are pivoted to non-use positions.

These and other objects will become apparent from a reading of the ensuing description together with the appended drawings.

DESCRIPTION OF THE PREFERRED EMBODIMENT

Figure 1:
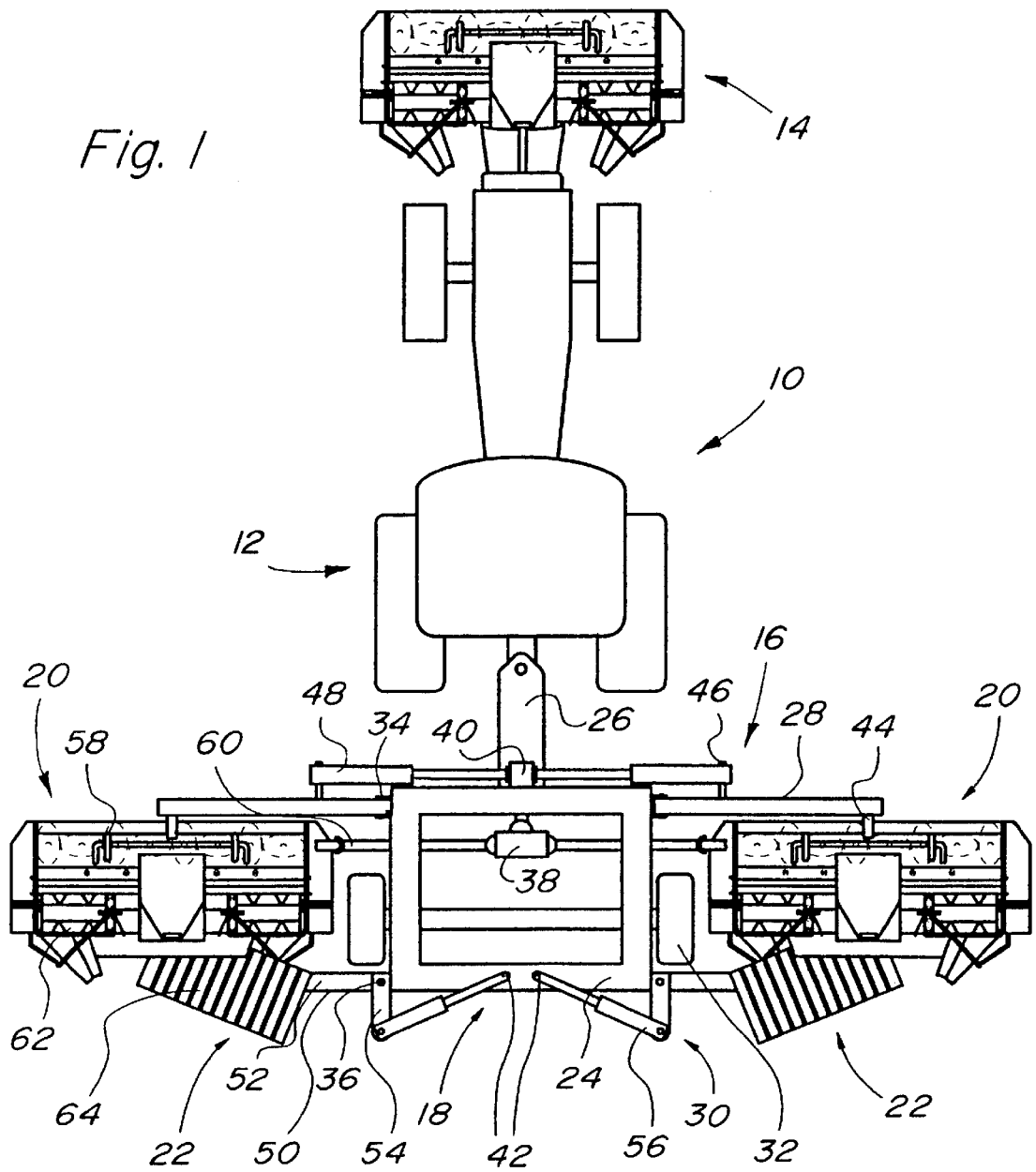
FIG. 1 is a top plan view of a tractor equipped with a front and two rear mowing units with the rear mowing units being mounted to a mobile frame and having horizontally pivoted swath formers.

Referring now to FIG. 1, there is shown a train 10 comprising a towing vehicle 12, usually an agricultural tractor, carrying a front mower 14, and a mowing implement 16 including a mobile frame adapted for being hitched to the towing vehicle 12.

During operation, the train 10 is moved across a field with crop to be mowed and has a mower width of several meters, in particular up to nine meters. During transport operation on the road, it is brought to a total width that is permitted by road traffic regulations.

The front mower 14 is of conventional configuration and is at least as wide as the towing vehicle 12, so that during its operation a strip is cut freely ahead of this. For that matter, the front mower 14 is only an advantageous component, not a necessary one; with a corresponding configuration of the mowing implement 16 it can also be omitted.

Among other components, the mowing implement 16 includes a frame 18, two mowing units 20 and, in this embodiment, two swath formers 22. The frame 18 includes a chassis 24, a tow bar 26, two lifting arms 28 and two cantilever arms 30. The chassis 24 is generally a square formed by steel tubes whose forward side is joined to the tow bar 26. An axle extends beneath and is fixed to the opposite longitudinal sides of the square, and, to opposite ends of the axle, ground wheels 32 are mounted which support the frame 18. The wheels 32 are not driven and are not steered. If necessary, the wheels 32 may be attached to the chassis 24 by respective arms that are mounted so as to pivot vertically with respect to it and for which purpose hydraulic cylinders would be attached between the arms and the frame. A joint 34 is mounted to each forward outer corner region of the frame 18, each joint defining a horizontal pivot axis extending in the direction of travel. At each rear outer corner region, there is provided a joint 36 which defines a vertical pivot axis. The chassis 24 includes a gear box 38 that is provided with a drive from the towing vehicle 12 in a known manner but which is not shown and which is transmitted to the side. Finally a bearing 40 is located at the center of the forward side of the chassis 24 and two attaching pins 42 are provided on the rear side.

The tow bar 26 provides the connection between the towing vehicle 12 and the mowing implement 16 and is connected to the draw bar of the towing vehicle by a vertical hitch pin so that the mowing implement may pivot horizontally about the hitch pin. In the embodiment according to FIG. 1, the tow bar 26 is relatively short.

Each of the lifting arms 28 is retained in the joint 34 so as to pivot vertically at its inner end region, that is, facing the centerline of the train 10, and carries a pivot journal 44 at it outer end region. Between the two end regions of each arm 28, a journal 46 is provided that extends in the direction travel. A lower, generally horizontal position is used for the operation, while an upper, generally vertical position is used for transport of the mowing implement 16. A servo motor 48, configured as a hydraulic cylinder in this embodiment, extends between the journal 46 of each lifting arm 28 and the bearing 40 on the chassis 24. Retraction of the servomotors 48 brings the lifting arms 28 into their transport position while extension of the servomotors brings the arms into their operating position. In place of the servo motors 48, a rope pull, a linkage or the like could also be used.

The cantilever arms 30 are also provided in mirror-image configuration on each side of the chassis 24 and each includes an angle lever 50. One leg 52 of the angle lever 50 carries a respective one of the swath formers 22, and, extending perpendicular to the leg 52 is another leg 54 which is connected to one end of a servo motor 56 having its other end retained by the attaching pin 42. At the intersection of the two legs 52 and 54, the angle lever 50 is pivotally mounted for swinging horizontally about the joint 36. A retraction of the servo motor 56 has the effect that the angle lever 50 occupies a position in which the longitudinal axis of the first leg 52 extends in the direction of travel and in which the swath former 22 is not operating. The angle lever 50 can be pivoted essentially 90° horizontally.

The mowing units 20 are configured essentially equal or as a mirror image and are located at the sides of the chassis 24. Each mowing unit 20 contains a mower 58, for example, in the form of a rotary cutterbar, supporting a plurality of disk mowers, that provides a width of cut of, for example, three meters and can be driven by means of a drive shaft 60 extending from the gearbox 38.

In the embodiment shown, the mower 58 is followed downstream by a conditioning unit 62, for example, in the form of a rotary conveyor with tines operating as an overshot conveyor, that conditions the mowed crop and delivers it to the swath former 22.

The swath former 22 includes a conveyor 64 that is configured in a known manner as a planar belt conveyor. In its operating position, the conveyor 64 extends partially under the conditioning unit 62 and extends at an angle to the direction of operation. The conveyor 64 is oriented in such a way that the crop is conveyed toward the center of the train 10 in order to form a large swath there together with the crop of the possible front mower 14 and that of the other mowing unit 20. While in the preferred embodiment two swath formers 22 are shown, the effect of the invention can be attained with only a single swath former 22. The conveyor 64 is preferably driven by means of a hydraulic motor, not shown. Depending on the configuration of the swath former 22, this can be applied, if desired, in connection with the left or the right mowing unit 20. The connection of the swath former 22 with the angle lever 50 is shown only schematically in the drawing. Actually, corresponding struts, retainers and the like are provided.

On the basis of this description, the operation of the embodiment disclosed in FIG. 1 is as follows.

In the operating position of the mowing units 20, the lifting arms 28 extend horizontally, with the servo motors 48 then being extended. If the operator desires that the crop be deposited directly on the ground in a single swath, that is, not conveyed by the swath formers 22 towards the center, the servo motors 56 are retracted, whereupon the swath formers 22 are pivoted to the rear and cannot take up crop. If the front mower 14 is included, then a single pass of the train 10 across a field results in three swaths of cut crop being left behind the train 10. If only a single wider swath is to be formed, the swath formers 22 are pivoted by means of the servo motors 56 underneath the conditioning units 62 or, if these are not present, under the discharge region of the mowing units 20. The crop that is then taken up is conveyed by means of the swath formers 22 toward the center of the train 10 and is thereby deposited immediately alongside the swath of the front mower 14 and the other mowing unit 20. The description should be understood in such a way that the crop of the mowing units 20 are not deposited in the center, but to one side of it, so that three swaths border with their edges against one another. Hence, conveying is performed only toward the center.

In order to assume a transport position, the servo motors 56 are retracted, so that the swath formers 22 are pivoted behind the chassis 24. Following that, the servo motors 48 are retracted so that the lifting arms 28 and with them the mowing units 20 and, if present, the conditioning units 62 are lifted. In this condition, the mowing implement 16 occupies a width allowable for transport operation over public roads.

Figure 2:
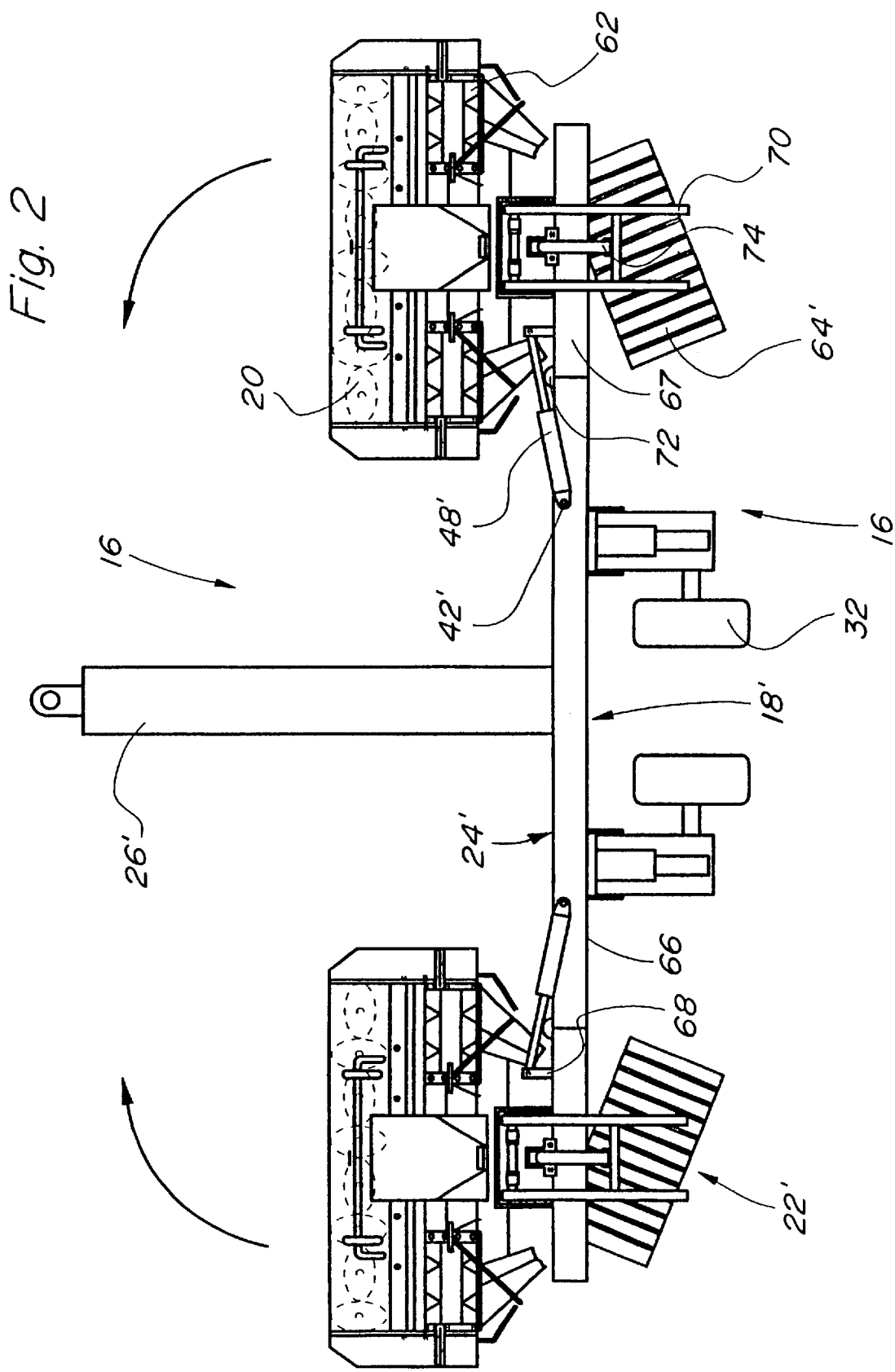
FIG. 2 is a top plan view of a mobile frame constructed in accordance with a second embodiment, and having two mowing units mounted thereto and with which are associated vertically pivotable swath formers.

FIG. 2 shows an alternative embodiment of a mowing implement 16 according to the invention that is described in the following only in so far as it differs from that of FIG. 1. A frame 18' includes a chassis 24' having a transverse beam 66 that is supported on the ground by the ground wheels 32, which can be repositioned in height. A towbar 26' is extends forwardly from a center location of the beam 66 and is adapted for connection to the vehicle 12, not shown. The transverse beam 66 occupies approximately the width of the towing vehicle 12 and has a massive configuration. In this embodiment, the towbar 26' is longer than in the embodiment according to FIG. 1, so as to extend forwardly beyond the mowing units 20 once the latter are folded forwardly for transport.

Attached to each of the ends of the transverse beam 66 is a cantilevered beam extension 67 that is supported in bearings in a joint 72 which establishes a vertical pivot axis about which the beam extension 67 pivots horizontally between a transversely extended operating position, as shown, and a forwardly extending transport position. A servo motor 48' extends between an arm 68 extending perpendicular to each beam extension 67 and an attaching pin 42' on the transverse beam 66. When the mowing units 20 are in their operating position, the transverse beam 66 and the beam extensions 67 extend along a centerline transverse to the direction of travel. Nevertheless a limited inclination of the beam extensions 67 with respect to the transverse beam 66 would thereby not be excluded.

On the forward side of each of the beam extensions 67, a respective one of the mowing units 20 is attached by means of a coupling, not shown, having a configuration that generally corresponds to that of the front mower 14.

Associated with each of the mowing units 20 is a swath former 22', which includes a cantilevered arm 70, a servo motor 74 and a conveyor 64'.

The cantilever arm 70 can be pivoted vertically about a horizontal axis, which extends transverse to the direction of travel, as illustrated in FIG. 2. The cantilever arm 70 is bent in the manner of a support arm and retains the conveyor 64' in the delivery region of the conditioning unit 62. As configured and arranged in the embodiment illustrated in FIG. 2, the conveyor 64' conveys cut crop toward the center.

The servo motor 74 is supported at one end on the beam extension 67 and at its other end on the cantilever arm 70 and, upon being extended, pivots the arm 70 with the conveyor 64' upward in a circular arc.

The embodiment of FIG. 2 performs the following operations.

As shown in FIG. 2, the mowing implement 16' is in a position in which both mowing units 20 and the swath formers 22' are in their operating position. Accordingly, crop is mowed by the mowing units 20, conducted to the associated conditioning unit 62 and delivered by this to the swath former 22' which conveys it toward the center and forms a wide swath there.

If, instead of a wide swath, several swaths are to be deposited on the ground at a spacing to each other, one or both servo motors 74 are actuated which there upon pivot the swath former(s) 22' from the operating position for intercepting crop delivered by the conditioning unit 62, into a raised non-operating position, in which the crop can fall to the ground immediately downstream of the conditioning unit 62.

For transport over the road, the servo motors 48' are retracted so that the beam extensions 67 pivot forwardly about the joints 72 toward the towbar 26 and, if possible, are supported there. The swath formers 22' are also brought into the raised position and do not extend beyond the allowable transport width. This embodiment has the advantage that the goal of the invention can be attained by means of known mower and swath forming units.

What is claimed is:

1. In a mowing implement including a mobile central frame, a pair of mowing units respectively mounted to opposite sides of said central frame, and at least one swath former being associated with one of said pair of mowing units, the improvement comprising: support structure mounting said at least one swath former to said frame, exclusive of said one of said pair of mowing units, for movement between an operating position, wherein it intercepts crop delivered by said one of said pair of mowing units and directs this crop toward the other of said pair of mowing units, and a non-operating position wherein it is located so as to permit crop delivered by said one of said pair of mowing units to fall onto the ground.

2. The mowing implement as defined in claim 1 wherein said support structure includes a swath former support arm mounted to said frame for pivoting about a vertical axis; and a powered actuator being coupled between the arm and the frame and operable for moving said swath former support arm between a first position corresponding to when said swath former is in said operating position, and a second position, pivoted rearwardly from said first position, corresponding to when said swath former is in said second position.

3. The mowing implement as defined in claim 1 wherein said central frame has a width no wider than a pre-selected width which is legally allowable for travel over a public road; a pair of mower unit support arms being vertically pivotally mounted to opposite sides of said frame and having outer ends respectively coupled to said pair of mowing units; and a pair of powered actuators coupled between said frame and respectively to said pair of mowing unit support arms for effecting movement of said pair of mowing unit support arms between horizontal operating positions and vertical non-operating positions, with said vertical non-operating positions of said pair of mowing unit support arms resulting in said mowing units also occupying a width no wider than said pre-selected width.

4. The mowing implement as defined in claim 3 wherein said central frame has transverse front and rear sides interconnected by right and left sides; said pair of mower unit support arms being located at respective front locations of said right and left sides.

5. The mowing implement as defined in claim 4 wherein said support structure includes a swath former support arm mounted to an outer rear location of one of said right and left sides; and a powered actuator being coupled between the swath former support arm and the frame and operable for moving said swath former support arm between a first position corresponding to when said swath former is in said operating position, and a second position, rearward of said first position, corresponding to when said swath former is in said non-operating position.

6. The mowing implement as defined in claim 1 wherein said central frame includes a transverse beam; an elongate draft tongue having a rear end fixed to a central forward side location of said transverse beam; said transverse beam including a pair of beam extensions respectively at opposite ends thereof defining a pair of mower unit support arms; a pair of hinge structures respectively coupling said pair of mower unit support arms to opposite ends of said transverse beam; said pair of hinge structures each defining a vertical pivot axis about which an associated one of said mower unit support arms is moveable between a transverse first position, corresponding to an operating position of said associated mower unit, and a fore-and-aft extending second position, corresponding to a non-operating position of said associated mower unit wherein said associated mower unit is positioned alongside said draft tongue; and a powered actuator extending between said beam and each mower unit support arm for moving each mower unit support arm between its first and second positions.

7. The mowing implement as defined in claim 6 wherein a swath former support arm is coupled to said at least one swath former and is mounted to one of said mower unit support arms for vertical pivotal movement between a lowered position, locating said at least one swath former in an operating position receiving crop from the mower unit associated with said one of said mower unit support arms, and a raised position locating said at least one swath former in a non-operating position permitting crop delivered by said mowing unit associated with said one of said mower unit support arms to fall directly to the ground; and said at least one swath former being oriented for delivering crop inwardly toward a central location between respective paths traversed by said pair of mowing units.

* * * * *